J. G. J. & A. C. M. MEUGNIOT.
AERIAL MACHINE.
APPLICATION FILED NOV. 27, 1911.
1,177,431.
Patented Mar. 28, 1916.
4 SHEETS—SHEET 3.
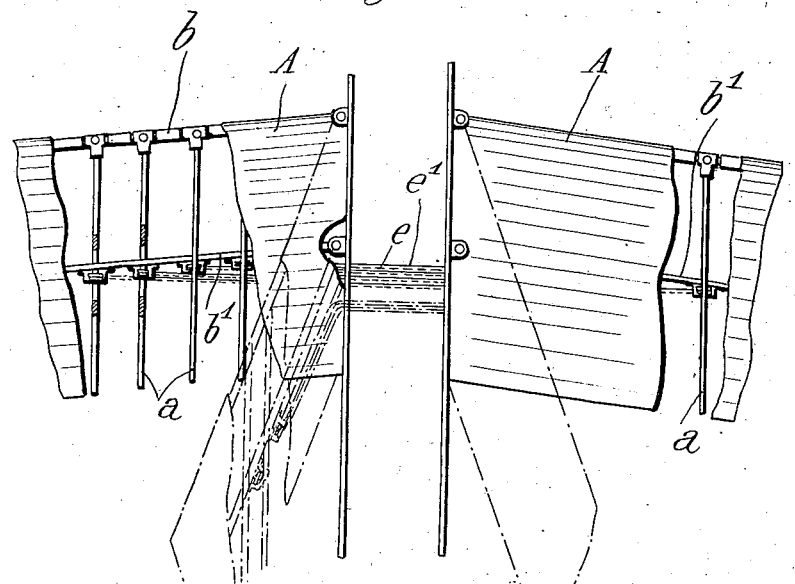
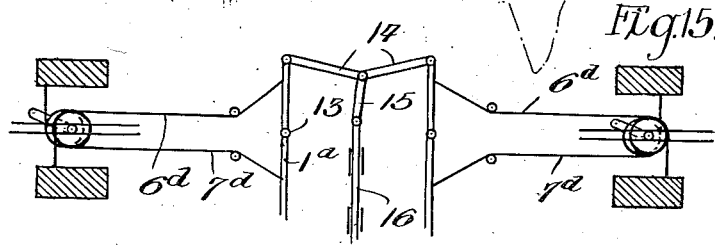
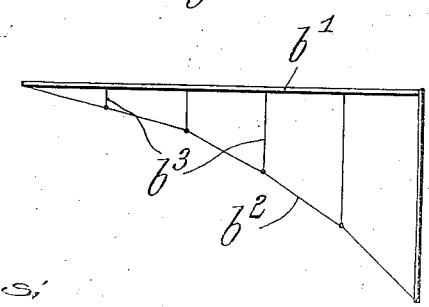

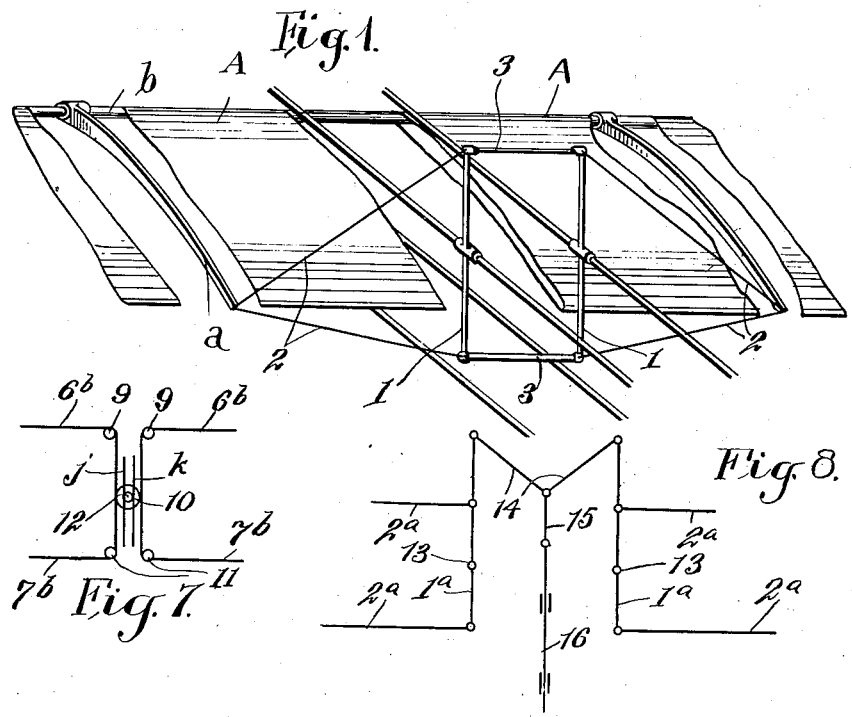

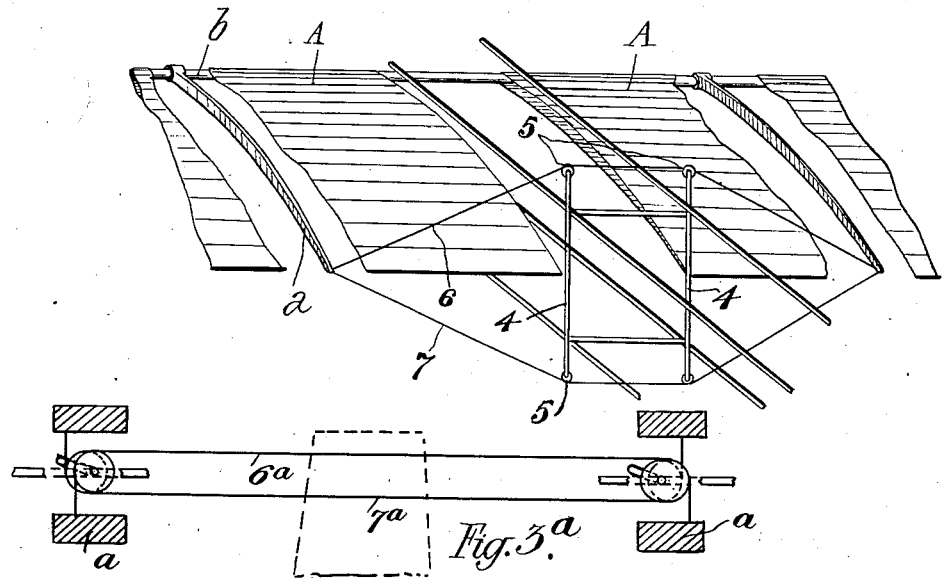
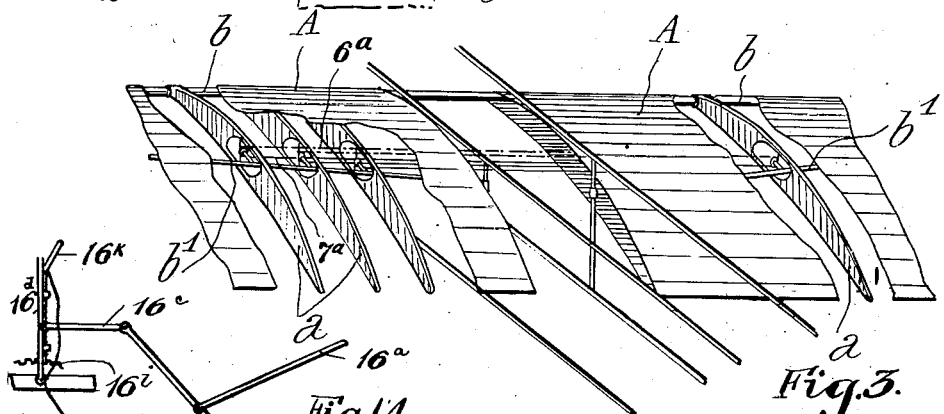
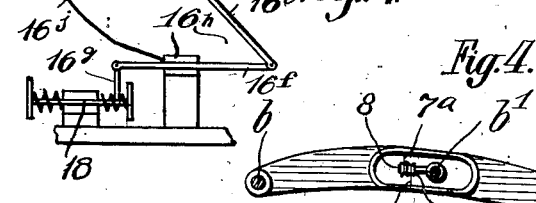

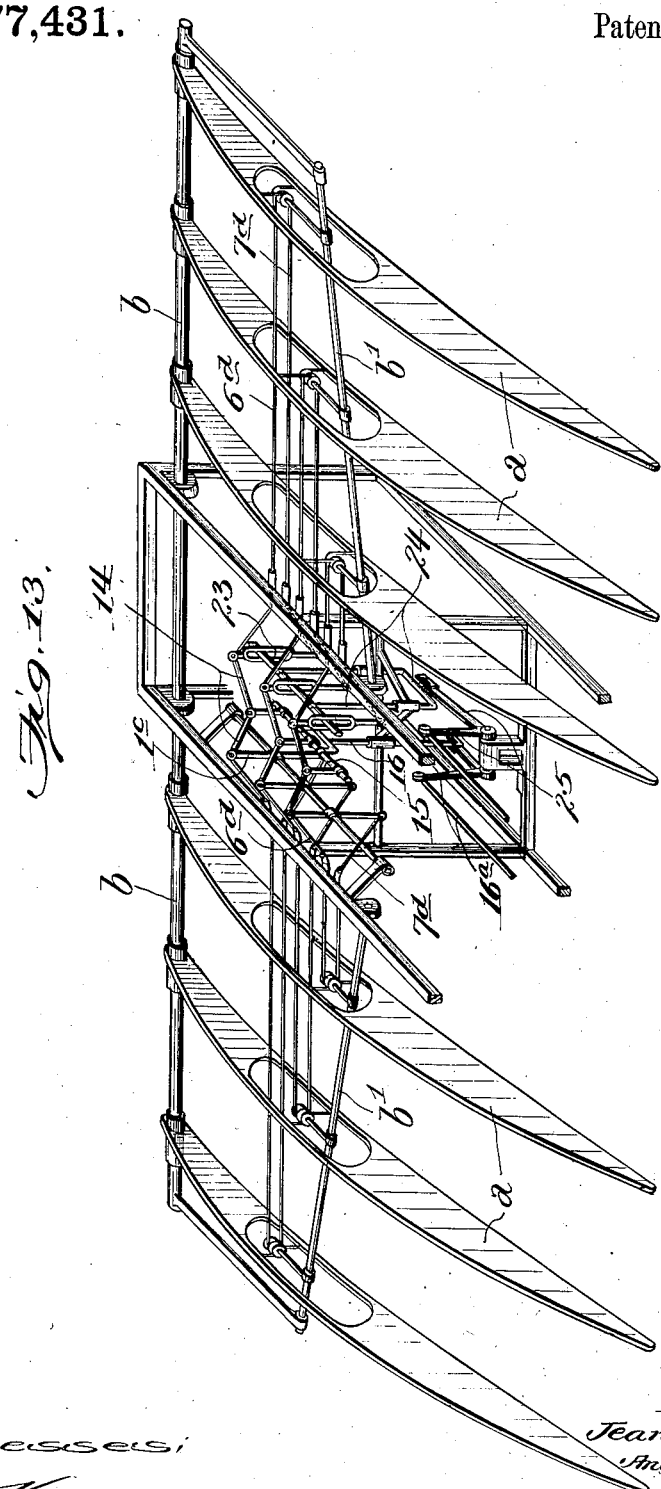

UNITED STATES PATENT OFFICE.

JEAN GABRIEL JOSEPH MEUGNIOT AND ANDRÉ CHARLES MARIE MEUGNIOT, OF ARC-LES-GRAY, FRANCE.

AERIAL MACHINE.

1,177,431.  Specification of Letters Patent.  Patented Mar. 28, 1916.

Application filed November 27, 1911. Serial No. 662,758.

*To all whom it may concern:*

Be it known that we, JEAN GABRIEL JOSEPH MEUGNIOT and ANDRÉ CHARLES MARIE MEUGNIOT, engineers, citizens of the Republic of France, residing at Arc-les-Gray, Haute-Saône, France, have invented certain new and useful Improvements in Aerial Machines, of which the following is a specification.

This invention relates to aeroplanes and similar machines in which two or more acting surfaces are connected together so that any displacement of one of the surfaces brought about by an air eddy or a similar cause brings about automatically the displacement of the other surfaces in the same or in the opposite direction.

It has for its object to increase the sensitiveness of such aeroplanes and similar machines, in order to make possible, with a view to insuring steadiness of the latter, deformations or automatic relative movements of the said surfaces under the action of disturbing forces acting on them, and at the same time, to enable the same surfaces to be operated by the pilot or by automatic apparatus, such as, for instance, clockwork, gyroscopes, etc., and on the other hand, to enable the said machines either to utilize the relative pulsations of the wind due to the variations of the speed of the air, by following a wavy trajectory, and thus to obviate to a certain extent dangers to which the wind from the rear exposes the said machines, or to follow a rectilinear trajectory whatever be the disturbing forces acting on the said surfaces, without the pilot having to do anything whatsoever for the purpose.

The invention chiefly consists in using, for obtaining parallel or differential connection of the active surfaces of the said machines, surfaces which are grouped in a pair or pairs of combined surfaces or of combined groups of surfaces, the said surfaces being constructed preferably in a manner similar to the well-known flexible surfaces by pivoting the ribs of the said surfaces on the longitudinal member; further in using means suitable for connecting, in parallel or differentially each of the constituent elements of the said surface, such, for instance, as the ribs, or only a certain number of the same, with the corresponding element of the combined surface, the surfaces thus obtained being preferably arranged in a manner suitable for enabling them to be detached or folded alongside the body of the said machines; further, in combining with the said surfaces means suitable for causing variations of incidence of two combined surfaces or of two combined groups of surfaces to be produced by the pilot or by automatic apparatus such for instance as by clockwork, gyroscopes, etc., without affecting or interfering with the double automatic movements of the connected surfaces.

The invention consists, moreover, in using an automatically acting apparatus regulating the trajectory, acting under the action of the variations of the component of the relative speed of the air according to a direction suitable for actuating the controlling means subjected to the action of the pilot, and which serves to modify the condition of the parts connecting together the movable separated parts of the surfaces, the object being that the active surfaces may never be subjected to the action of relative rear currents.

Embodiments of the invention, and of the various features thereof, are illustrated in the accompanying drawings, wherein:

Figure 1 is a detail perspective view illustrating one method of connecting corresponding elements of the companion acting surfaces to make possible automatic compensating deformations of these surfaces; Fig. 2 is a similar view illustrating a second method of connecting the said elements for the purpose stated; Fig. 3 is a similar view illustrating a third method of connecting the said elements for the purpose stated; Fig. 3ª is a diagram illustrating details of the embodiment shown in Fig. 3; Fig. 4 is a detail side elevation showing a pivotally mounted rib which forms a part of the skeleton of the acting surfaces and connections applied thereto, according to the method shown in Fig. 3; Fig. 5 is a detail plan view, partly broken away, showing the connections illustrated in Fig. 3 in connection with a skeleton of foldable character; Fig. 6 is a view in a vertical plane illustrating a detail of construction comprehended in the arrangement shown in Fig. 3; Fig. 7 is a diagrammatic view illustrating an arrangement whereby the deformations of the connected elements of the acting surfaces may be in the same or in opposite directions; Figs. 8, 9, and 10 are diagrammatic views of a second arrangement for the same purpose; Fig. 11 is a diagrammatic view illustrating an arrangement which provides for adjustments of the relative displacement of the connected elements; Fig. 12 is a detail view of a device by which the speed of the air or pulsations in the wind may be utilized for governing the trajectory of the aeroplane; Fig. 13 is a perspective view showing a physical combination of a number of features illustrated in the preceding figures; Fig. 14 is a diagrammatic view illustrating an application of the device shown in Fig. 12 to the machine shown in Fig. 13; Fig. 15 is a diagram illustrating details of the embodiment shown in Fig. 13.

Similar characters of reference designate corresponding parts throughout the several views.

In the embodiments shown, the features of the invention are applied in connection with the sustaining planes of the machine, the skeleton of which includes ribs $a$ and a member $b$ transverse to the said ribs and to which the latter are pivoted at their forward ends. The deformations of the acting surfaces result from movements of these ribs and by connecting corresponding ribs of the companion surfaces, operative combinations are effected of corresponding zones or groups of zones of said surfaces.

The connections shown in Fig. 1 comprise a pair of levers 1 which normally stand in approximately vertical position and are pivoted centrally thereof to the body of the aeroplane. The levers 1 are shown as arranged in the rear of the planes and their ends, which are located at opposite sides of the extended planes of the acting surfaces A, are connected to the rear ends of the corresponding ribs of said surfaces by the cables 2. Links or equivalent connections 3 extend between the ends of the levers 1 and transmit movement therebetween. The pivotal connection of the ribs $a$ with the member $b$ is sufficiently loose to enable said ribs to have a lateral, as well as a pivotal, component of movement. It is obvious that if one of the ribs $a$ of one acting surface be raised, consequent to a deformation of the element of said surfaces with which said rib is associated, by an air eddy, the corresponding rib of the other surface will be lowered, and in this way the deformation of the first-named surface will be compensated.

In the construction shown in Fig. 2, instead of pivoted levers 1, stationary posts 4 are employed. The posts 4 are supported by the body of the aeroplane, and at their upper and lower ends carry pulleys 5 which serve as guides for upper and lower cables 6 and 7 respectively, connecting corresponding ribs $a$. In this case, as in the preceding case, when one of the ribs $a$ is raised, the corresponding connected rib is lowered, and vice versa.

In the construction shown in Figs. 3, $3^a$ and 4, longitudinal members $b'$ are arranged at each side of the aeroplane, about mid-way between the ends of the ribs $a$. The members $b'$ are carried by the body of the aeroplane, being suitably braced with relation to the members $b$, and extend through relatively deep slots in the ribs $a$. Said members $b'$ support pulleys 8 which form guides for cables $6^a$ and $7^a$, corresponding to the cables 6 and 7 respectively, the cables $6^a$ having their ends connected to the ribs $a$ at the lower sides of the slots through which the members $b'$ extend and the cables $7^a$ having their ends connected to the ribs $a$ at the upper sides of said slots, (Fig. $3^a$). The number of pairs of cables $6^a$ and $7^a$ employed, of course, correspond to the number of pairs of corresponding ribs to be connected, and the pulleys 8 are so arranged that there is no liability of entanglement of these cables. Thus, in Fig. 3, the members $b'$ converge outwardly with reference to the members $b$, and the cables $6^a$ and $7^a$ are parallel to said members $b$, whereas in Fig. 5, the members $b$ and $b'$, which are parallel, extend obliquely with reference to the longitudinal axis of the machine, and the cables $6^a$ and $7^a$ are normal to said axis. The cables $6^a$ and $7^a$ are arranged in the interior of the planes, and in this way head resistance is avoided.

Fig. 5 shows a construction in which the connections shown in Fig. 3 are incorporated, but wherein the skeletons of the planes A are foldable. In this case, the members $b$ and $b'$ are pivoted to the body of the aeroplane on vertical axes, so as to be swung rearwardly, and the ribs $a$ are pivoted on vertical axes to the members $b$. This arrangement enables the said skeleton to be collapsed, as indicated by dotted lines in Fig. 5, in which condition the members $b$ and $b'$ are folded rearwardly toward the sides of the body of the machine, and, in connection with the ribs $a$, define relatively flat parallelograms.

As regards the shrouds for the longitudinal members $b'$, reference is had to Fig. 6, which shows a shroud $b^2$ arranged below the member $b'$ and connected at its ends to the outer end of the member $b'$ and to the body of the aeroplane, the shroud $b^2$ being inclined downwardly toward said body, and vertical shrouds $b^3$ connecting the members $b'$ at intervals with the shroud $b^2$. The shrouds $b^3$ are arranged normal to the member $b'$, and consequently, require merely small apertures in the surfaces through which they pass. In all of the embodiments described, a movement of a rib $a$ in one direction causes, through the agency of the connections referred to, a compensating movement in the opposite direction of the corresponding rib $a$. In this way a deformation of a zone or element of one surface A results in an automatic compensating deformation of a corresponding zone or element of the companion surface.

Figs. 7 to 10 illustrate connections of the character generally described, in combination with means for producing deformations of the corresponding elements or zones of the companion acting surfaces in the same direction. Fig. 7 assumes the use of cables $6^b$ and $7^b$, corresponding to the cables 6 and 7 and $6^a$ and $7^a$, referred to in the preceding description. In this case, the cables $6^b$ pass over guide pulleys 9, carried by the body of the aeroplane, and over a central guide pulley 10, and the cables $7^b$ pass over guide pulleys 11 and over a central guide pulley 12. The pulleys 10 and 12 are mounted coaxially upon a common spindle $k$, and the cables $6^b$ and $7^b$ pass in relatively opposite directions about the respective pulleys 10 and 12. The spindle $k$ is slidable vertically through an extended plane of its longitudinal axis, being directed in such movement by guides $j$ and may be operated in such sliding movement by any suitable means. The sliding movement of the spindle $k$ and therewith of the pulleys 10 and 12 results in one of the cables $6^b$ or $7^b$, as the case may be, (in accordance with the direction of sliding movement of the spindle $k$) having its effective length increased, and the other cable having its effective length decreased. In this way movements of the connected corresponding elements of the acting surfaces in the same direction are obtained. Yet the arrangement does not interfere with the automatic deformations of said corresponding elements in opposite directions, consequent to the natural disturbing influences. The construction shown in Figs. 8 to 10 embodies the same principles of operation, and is applicable where, instead of the continuous cables, such as are employed in the arrangement shown in Figs. 2 and 3, levers of the nature shown in Fig. 1 are used. These levers, which are designated by the character $1^a$, correspond to the levers 1 of Fig. 1, and are connected by cables $2^a$, corresponding to the cables 2 of Fig. 1, to the ribs $a$. The cables $2^a$ are arranged symmetrically with reference to the pivots 13 of the levers $1^a$, and the latter are preferably extended beyond the upper cables $2^a$, and at their ends are pivotally connected to links 14. The links 14 are pivoted to one another, and their mutual pivot serves also to join a link 15, which connects the links 14, and a slidable operating member 16.

Fig. 8 shows the normal relation of the parts. It will be obvious that sliding movements of the member 16 will result in movements of the levers $1^a$ in opposite directions, and consequently, in deformations in the same direction of the corresponding connected elements of the companion planes. Fig. 10 illustrates such movements of the member 16 and of the levers $1^a$. However, the arrangement permits of automatic deformations of the companion connected elements of the planes in opposite directions, as already described. Thus, Fig. 9 shows the lever $1^a$ at the left, as being pulled by the upper cable $2^a$, and the lever $1^a$ at the right, as having a similar movement in the same direction, and in this way, the operations set forth in connection with the description of the construction shown in Fig. 1 are achieved. The device for causing simultaneous deformations in the same direction of the connected elements may be operated either by the aviator or by automatic apparatus, such, for example, as clockwork, gyroscopes, etc.

Fig. 11 shows an arrangement wherein levers $1^b$, similar to the levers 1 of Fig. 1, and cables $2^b$, similar to the cables 2 of Fig. 1, are employed, and wherein provision is made for modifying the incidence of the two connected elements of the companion surfaces. In this case, the levers $1^b$ are connected by a link 17 which is pivoted to said levers and which also has a slidable connection with one of the said levers. As shown, the link 17 is slidably connected to the lever $1^b$ at the right of the drawing, and by moving the slidable pivotal connections of all the links 17 to similar positions along the levers $1^b$, on which said connections are mounted, variations of the relative inclination of the companion acting surfaces may be obtained. In this way the connections may be operated to enable the equilibrium of the machine to be reëstablished after it has been disturbed by an influence exceeding the capacity of the normal compensating action of said connections, such, for example, as the shifting of the load. Various other arrangements may be employed to obtain variations of the relative inclination of the two companion surfaces. Thus, in the construction illustrated in Figs. 8 to 10, one of the links 14 may have a slidable pivotal connection with its corresponding lever $1^a$, or, as shown in Fig. 13, the result stated may be achieved by varying the pivots of the levers $1^c$ at one side of the machine.

Fig. 12 illustrates a device which enables the pulsations of the wind to be utilized in causing the machine to follow a trajectory of determined character. This device may conveniently comprise a slidable rod 18, working in a bearing 19 which is carried by the body of the aeroplane, and having at its end relatively large plates 20 and 21 to receive the force of the wind pulsations. The rod 18 is held in normal relation by springs 22, and is operatively connected to the means for causing deformations of the corresponding elements of the companion acting surfaces, such means being illustrated in Figs. 8 to 10. The connections between the device shown in Fig. 12 and the said operating means preferably comprises a control gear of the Bowden type (which, as is well known, consists of a flexible pipe and a wire or cable passing through the same), suitable for moving control parts, such as the spindle $k$ of Fig. 7, or the slidable member 16 of Figs. 8 to 10, or the slidable pivotal connection of the link 17, of Fig. 11. The flexible pipe of the Bowden gearing will have its ends connected to the respective frames of the controlling element and the device to be controlled and the wire of said gearing which passes through said pipe connects the controlling element and the device to be controlled. With such a transmission arrangement no action is exerted on the wire when the pipe is moved consequent to a modification of the relative positions of the two frames to which the ends of the pipe are connected. The Bowden gearing employed will include elements which will enable the character of the trajectory to be determined; that is to say, which will enable an increase of the pressure of air on the plate 21 to cause an increase of the incidence of the acting surfaces, or, on the other hand, to enable an increase of the pressure of air on the plate 21 to cause a decrease of the said incidence. In the first case, if a decrease in pressure occurs on the front plate 21, a decrease of the incidence of the bearing surfaces is produced, and the aeroplane can thus gain speed and momentum as it offers a smaller resistance to the advance. As soon as the plate 21 is exposed to an increase of pressure, the incidence of the bearing surfaces increases, and the aeroplane expends its excess of momentum by utilizing the increase of its relative speed, and rises. If the plate 20 is exposed to an increase of wind pressure, which might occur in the case of a gust of wind from the rear, the incidence of the bearing surfaces decreases, and can even become negative, and the aeroplane, as is also the case when the front plate 21 is subjected to a decrease of the pressure of air, gains an increase of relative speed, to which is added the speed of fall, due to an increase of the incidence of the bearing surfaces. When the pressure in the direction opposite to that of the travel of the aeroplane becomes normal, the incidence of the bearing surfaces assumes its normal value, and the aeroplane utilizes its increase of relative speed previously acquired, in ascending flight. Thus, the pulsations of the wind are utilized to cause the aeroplane to follow a wavy trajectory. In the second case, that is, in the case in which an increase in the pressure of the air on the front plate 21 causes a decrease of the incidence of the bearing surfaces, the aeroplane can maintain a constant level, and consequently, move in a straight line. The plates 20 and 21 are preferably designed so as to enable them to present a concave surface to the wind, for the purpose of rendering them sensitive and responsive.

Figs. 13 and 14 illustrate a construction wherein connections of the general character shown in Figs. 3 and 4 are combined with an operating means of the character shown in Figs. 8 to 10 and with an arrangement for enabling variations of the relative inclination of the companion acting surfaces. In this case, reference being had to Fig. 13, the cables $6^d$ and $7^d$ correspond to the cables $6^a$ and $7^a$ of Fig. 3 and levers $1^c$ correspond to the levers $1^a$ of Figs. 8 to 10. The cables $6^d$ and $7^d$ are connected to the levers $1^c$, respectively, at points above and below the pivots of said levers and are trained over pulleys carried by members $b^1$ which are precisely similar to the members $b^1$ shown in Fig. 3 and which pass through slots in the ribs $a$. The cables $6^d$ are connected to the lower walls of the slots through which the members $b^1$ extend and the cables $7^d$ are connected to the upper walls of said slots. There is a group of cables $6^d$ and $7^d$ at the right side of the aeroplane which are attached to the right hand group of levers $1^c$ and there is a similar group of cables $6^d$ and $7^d$ at the left side of the aeroplane which are attached to the left-hand group of levers $1^c$. The levers $1^c$ are connected in pairs by links 14, joined to the upper end of said levers and also connected, at their mutual pivots, by the links 15, to the slidable member 16, the movements of which are effected by a lever organization $16^a$. It will be obvious that an operation of the lever system $16^a$ will result in movements of the levers $1^c$ in opposite directions, and consequently, in deformations in the same direction of the corresponding connected elements of the companion planes. However, the arrangement permits of automatic deformations of the companion connected elements of the planes in opposite directions, as already described. Fig. 13 also shows an alternative form of means for obtaining variations of the relative inclination of the companion acting surfaces. In this case, the pivot of the levers $1^c$, at the right of the machine, consists of a rod 23, which passes through vertical slots in said levers and is vertically adjustable. The support for this rod comprises a yoke 24, which is raised and lowered by a lever system 25. Obviously, by moving the rod 23 to different positions in the slots of the levers 1ᵉ, for which said rod forms a pivot, corresponding variations of the relative inclination of the two companion surfaces may be obtained.

Fig. 14 illustrates an application of the device shown in Fig. 12, according to which a link element of the lever system 16ᵃ (Fig. 13) is pivotally connected to a cross-bar 16ᵇ and inasmuch as said lever system must be under the control of the aviator, notwithstanding that it may be operated by the device of Fig. 12, one end of the cross-bar is connected by means of a link 16ᶜ to a lever 16ᵈ, for convenience, termed the "pilot" lever. The other end of the cross-bar 16ᵇ is connected by a link 16ᶠ to a post 16ᵍ on the rod 18. When the lever system 16ᵃ is operated by the wind actuated device, the cross-bar 16ᵇ turns about its pivotal connection with the link 16ᶜ and the pilot lever 16ᵈ is locked against movement. On the other hand, when the lever system 16ᵃ is operated by the pilot lever 16ᵈ, the rod 16ᵇ turns about its pivotal connection with the link 16ᶠ and said link is locked. Any suitable means may be provided for locking the lever 16ᵈ or the link 16ᶠ, as the case may be. The link 16ᶠ is movable through a locking device 16ʰ which is only shown conventionally. The lever 16ᵈ is movable with relation to a notched quadrant 16ⁱ and carries the usual locking rod for coöperation with said quadrant. It is preferred to connect the operating arm 16ᵏ for this locking rod by means of a flexible shaft 16ʲ to the locking device 16ʰ whereby when the arm 16ᵏ is operated to lock the lever 16ᵈ to its quadrant, the link 16ᶠ will be free to move through the device 16ʰ, but when the arm 16ᵏ is operated to unlock the lever 16ᵈ, the device 16ʰ will lock the link 16ᶠ. It will be understood that there is sufficient loose play in the connections of the lever system 16ᵃ to provide for its operative movement consequent to the movement of the cross-bar 16ᵇ.

Having fully described our invention, we claim:

1. An aeroplane having each of its companion acting surfaces made up of individually displaceable elements arranged in transverse juxtaposition and connections between corresponding elements of said surfaces whereby a displacement of one element in either direction by an air eddy will be positively transmitted to the corresponding element of the other surface to produce a compensating displacement thereof.

2. An aeroplane having the skeletons of its companion acting surfaces made up of parallel pivotally mounted ribs which divide said surfaces into a number of individually displaceable elements and connections between corresponding ribs of said surfaces whereby a displacement of one element in either direction by an air eddy will be positively transmitted to the corresponding element of the other surface to produce a compensating displacement thereof.

3. An aeroplane having the skeletons of its companion acting surfaces made up of parallel pivotally mounted ribs which divide said surfaces into a number of individually displaceable elements and connections between corresponding ribs of said surfaces whereby a displacement of one element by an air eddy will produce a compensating displacement of the corresponding element of the other surface, the connections including upper and lower cables, and means for guiding said cables.

4. An aeroplane having the skeletons of its companion acting surfaces made up of parallel pivotally mounted ribs which divide said surfaces into a number of individually displaceable elements and connections between corresponding ribs of said surfaces whereby a displacement of one element by an air eddy will produce a compensating displacement of the corresponding element of the other surface, the ribs being slotted and the connections including upper and lower cables which pass through the slots, and members also passing through the slots and carrying guide pulleys for said cables.

5. An aeroplane having its companion acting surfaces made up of individually displaceable elements, connections between corresponding elements of said surfaces whereby a displacement of one element in either direction by an air eddy will be positively transmitted to the corresponding element of the other surface to produce a compensating displacement thereof, and means for operating said connections to produce simultaneous displacements in the same direction of the corresponding connected elements.

6. An aeroplane having its companion acting surfaces made up of individually displaceable elements, connections between corresponding elements of said surfaces whereby a displacement of one element in either direction by an air eddy will be positively transmitted to the corresponding element of the other surface to produce a compensating displacement thereof, operating means for causing said connections to produce displacements of the corresponding elements, and a device influenced by variations in the wind pressure for controlling the action of said operating means.

7. An aeroplane having its companion acting surfaces made up of individually displaceable elements, connections between corresponding elements of said surfaces whereby a displacement of one element by an air eddy will produce a compensating displacement of the corresponding element of the other surface, operating means for causing said connections to produce displacements of the corresponding elements, and a device influenced by variations in the wind pressure for controlling the action of said operating means, the device comprising a slidable member having plates at the ends thereof to receive the force of the wind and springs for holding said member in a normal position.

8. An aeroplane having the skeletons of its companion acting surfaces made up of parallel ribs, members located at the front of the aeroplane and to which the ribs are pivoted for universal movement, the members being pivoted to the body of the aeroplane to fold rearwardly toward said body, the ribs dividing the acting surfaces of the aeroplane into a number of individually displaceable elements, connections between corresponding ribs of said surfaces whereby a displacement of one element by an air eddy will produce a compensating displacement of the corresponding element of the other surface, the ribs being slotted and the connections including upper and lower cables which pass through the slots, and members also passing through the slots and carrying guide pulleys for said cables, the last-named members being pivoted to the body of the aeroplane and being foldable rearwardly toward said body.

In testimony whereof we have hereunto set our hands in presence of two subscribing witnesses.

JEAN GABRIEL JOSEPH MEUGNIOT.
ANDRÉ CHARLES MARIE MEUGNIOT.

Witnesses:
H. C. COXE,
PAUL BLUM.